US012613094B2

(12) United States Patent
Captarencu

(10) Patent No.: US 12,613,094 B2
(45) Date of Patent: Apr. 28, 2026

(54) LASER POCKET LEVEL MULTI-AXIS MICRO ADJUST

(71) Applicant: Klein Tools, Inc., Lincolnshire, IL (US)

(72) Inventor: Catalin Virgil Captarencu, Barrington, IL (US)

(73) Assignee: Klein Tools, Inc., Lincolnshire, IL (US)

( * ) Notice: Subject to any disclaimer, the term of this patent is extended or adjusted under 35 U.S.C. 154(b) by 413 days.

(21) Appl. No.: 18/371,581

(22) Filed: Sep. 22, 2023

(65) Prior Publication Data

US 2025/0102299 A1    Mar. 27, 2025

(51) Int. Cl.
*G01C 9/06* (2006.01)
*G01C 9/34* (2006.01)

(52) U.S. Cl.
CPC ................. *G01C 9/06* (2013.01); *G01C 9/34* (2013.01); *G01C 2009/066* (2013.01)

(58) Field of Classification Search
CPC ....... G01C 9/02; G01C 2009/066; G01C 9/06
USPC ........ 33/275 R, 281, 282, 285, 286, DIG. 21
See application file for complete search history.

(56) References Cited

U.S. PATENT DOCUMENTS

| | | | | |
|---|---|---|---|---|
| 5,568,265 | A * | 10/1996 | Matthews | G01B 11/27 |
| | | | | 356/138 |
| 5,782,003 | A * | 7/1998 | Bozzo | G01C 15/004 |
| | | | | 33/285 |
| 5,894,675 | A * | 4/1999 | Cericola | G01B 3/1071 |
| | | | | 33/760 |
| 6,012,229 | A * | 1/2000 | Shiao | G01C 15/008 |
| | | | | 33/227 |
| 6,249,983 | B1 * | 6/2001 | Wright | F16M 11/14 |
| | | | | 33/290 |
| 6,532,676 | B2 * | 3/2003 | Cunningham | G01C 15/008 |
| | | | | 33/286 |
| 6,857,193 | B2 * | 2/2005 | Kallesen | G01C 15/008 |
| | | | | 33/286 |
| 7,464,478 | B2 * | 12/2008 | Adrian | B23Q 17/2404 |
| | | | | 33/642 |
| 7,748,127 | B1 * | 7/2010 | Cosimano | G01C 15/002 |
| | | | | 33/286 |
| 7,838,808 | B1 * | 11/2010 | Ake | G01J 1/44 |
| | | | | 250/214 R |
| 8,307,562 | B2 * | 11/2012 | Bascom | G01C 15/004 |
| | | | | 33/286 |
| 8,893,395 | B2 * | 11/2014 | Mickow | G01C 15/002 |
| | | | | 33/529 |
| 8,904,659 | B2 * | 12/2014 | Zhang | G01R 31/001 |
| | | | | 33/286 |
| 11,125,877 | B2 * | 9/2021 | McGill | G01C 15/008 |
| 11,150,069 | B1 * | 10/2021 | Strong | G01C 9/06 |
| 11,549,810 | B2 * | 1/2023 | Holloway | G01C 15/004 |

(Continued)

FOREIGN PATENT DOCUMENTS

| | | | | |
|---|---|---|---|---|
| EP | | 3239655 A1 * | 11/2017 | G01C 15/004 |

*Primary Examiner* — George B Bennett

(57) ABSTRACT

A laser level includes a housing having a laser emitter to emit a laser along a plane. The laser level includes a mounting base connected to the housing. The housing is pivotable relative to the mounting base about three axes by a user grasping the housing and moving the housing. The housing includes a first micro-adjustment knob to adjust the housing, relative to the mounting base, about a fourth axis. The housing includes a second micro-adjustment knob to adjust the housing, relative to the mounting base, about a fifth axis perpendicular to the fourth axis.

16 Claims, 13 Drawing Sheets

(56)                     References Cited

U.S. PATENT DOCUMENTS

| 12,031,819 B2 * | 7/2024 | Yan | G01C 9/34 |
| 12,123,543 B2 * | 10/2024 | Kasahara | G01C 9/02 |
| 2003/0014872 A1 * | 1/2003 | Chen | G01C 15/004 |
| | | | 33/286 |
| 2006/0283029 A1 * | 12/2006 | Jan | G01C 15/002 |
| | | | 33/286 |
| 2019/0331488 A1 * | 10/2019 | Corrigan | G01B 11/26 |
| 2020/0363190 A1 * | 11/2020 | Lee | G01C 9/02 |
| 2024/0044644 A1 * | 2/2024 | Burney | G01C 9/06 |
| 2024/0060776 A1 * | 2/2024 | Eidinger | G01C 15/004 |
| 2024/0255267 A1 * | 8/2024 | Captarencu | G01B 3/566 |
| 2025/0003747 A1 * | 1/2025 | Captarencu | G01C 9/06 |
| 2025/0137783 A1 * | 5/2025 | Yeomans | G01C 15/008 |
| 2025/0314491 A1 * | 10/2025 | Li | G01C 9/06 |

* cited by examiner

10

10

10

10

LASER POCKET LEVEL MULTI-AXIS MICRO ADJUST

BACKGROUND OF THE DISCLOSURE

The present disclosure relates to laser levels, and more specifically laser levels with multiple axis of adjustment. Laser levels are well known and are used to project a laser beam in a plane from the level, often along a horizontal or vertical axis. Examples of laser levels include self-leveling and manual laser levels. Self-leveling laser levels can automatically adjust the orientation of the emitted laser to create a level laser. Manual laser levels must be manually adjusted by a user, where it is desirable to provide an easy way for the user to ensure that the laser is emitted along a level plane.

BRIEF SUMMARY OF THE DISCLOSURE

In accordance with one feature of this disclosure, a laser level is provided and includes a housing including a laser emitter to emit a laser along a plane. The laser level includes a mounting base connected to the housing. The housing is pivotable relative to the mounting base about three axes by a user grasping the housing and moving the housing. The housing includes a first micro-adjustment knob to adjust the housing, relative to the mounting base, about a fourth axis. The housing includes a second micro-adjustment knob to adjust the housing, relative to the mounting base, about a fifth axis perpendicular to the fourth axis.

In another feature, the fifth axis is perpendicular to the fourth axis.

In one feature, the housing includes a bubble level to indicate the levelness of the housing relative to one of the three axes and the fourth axis.

According to another feature, the housing includes a first bubble level and a second bubble level. The first bubble level indicates the levelness of the housing relative to the first axis and the fourth axis. The second bubble level indicates the levelness of the housing relative to the second axis and the fifth axis.

In another feature, the housing includes a third bubble level on a side of the housing different from the first bubble level, and the third bubble level indicates the levelness of the housing relative to the first axis and the fourth axis.

As one feature, the mounting base includes a magnet and at least one through hole for mounting the mounting base to a structure.

In one feature, the housing is pivotable relative to the mounting base about the three axes without movement of the first micro-adjustment knob and the second micro-adjustment knob.

In accordance with one feature, a laser level includes a housing including a laser emitter to emit a laser along a plane. The laser level includes a mounting base connected to the housing, where the housing is manually pivotable relative to the mounting base about a first axis and a second axis. The housing includes a first micro-adjustment knob to adjust the housing, relative to the mounting base, about a third axis. The housing also includes a second micro-adjustment knob to adjust the housing, relative to the mounting base, about a fourth axis.

As another feature, the housing includes a bubble level to indicate the levelness of the housing relative to the first axis and the third axis.

According to one feature, the housing is manually pivotable relative to the mounting base by a user grasping the housing and moving the housing.

In another feature, the housing includes a first bubble level, a second bubble level, and a third bubble level. The first bubble level indicates the levelness of the housing relative to the first axis and the fourth axis, the second bubble level indicates the levelness of the housing relative to the second axis and the fifth axis, and the third bubble level indicates the levelness of the housing relative to the first axis or the second axis.

In accordance with one feature, laser level includes a housing including a laser emitter to emit a laser along a plane and a level indicator. The laser level includes a mounting base connected to the housing, where the housing is pivotable relative to the mounting base about a first axis, a second axis, and a third axis. The housing includes a first micro-adjustment knob to adjust the housing, relative to the mounting base, about a fourth axis. The housing includes a second micro-adjustment knob to adjust the housing, relative to the mounting base, about a fifth axis perpendicular to the fourth axis.

In another feature, the first axis is parallel to the fourth axis and the second axis is parallel to the fifth axis.

According to one feature, the first axis, the second axis, and the third axis are perpendicular to each other.

As one feature, the level indicator is a bubble level.

As another feature, the housing is pivotable relative to the mounting base by a user rotating the first micro-adjustment knob or the second micro-adjustment knob.

According to another feature, the housing is pivotable relative to the mounting base by a user grasping the housing and moving the housing.

DETAILED DESCRIPTION OF PREFERRED EMBODIMENTS

FIGS. 1-12 illustrate an adjustable laser level 10. In the illustrated and preferred embodiment, the laser level 10 emits a laser line therefrom. The laser level 10 is adjustable via both a bulk adjustment and a fine adjustment mechanism to allow a user to move and fine tune the position of the laser emitted by the laser level 10.

Figure 1:
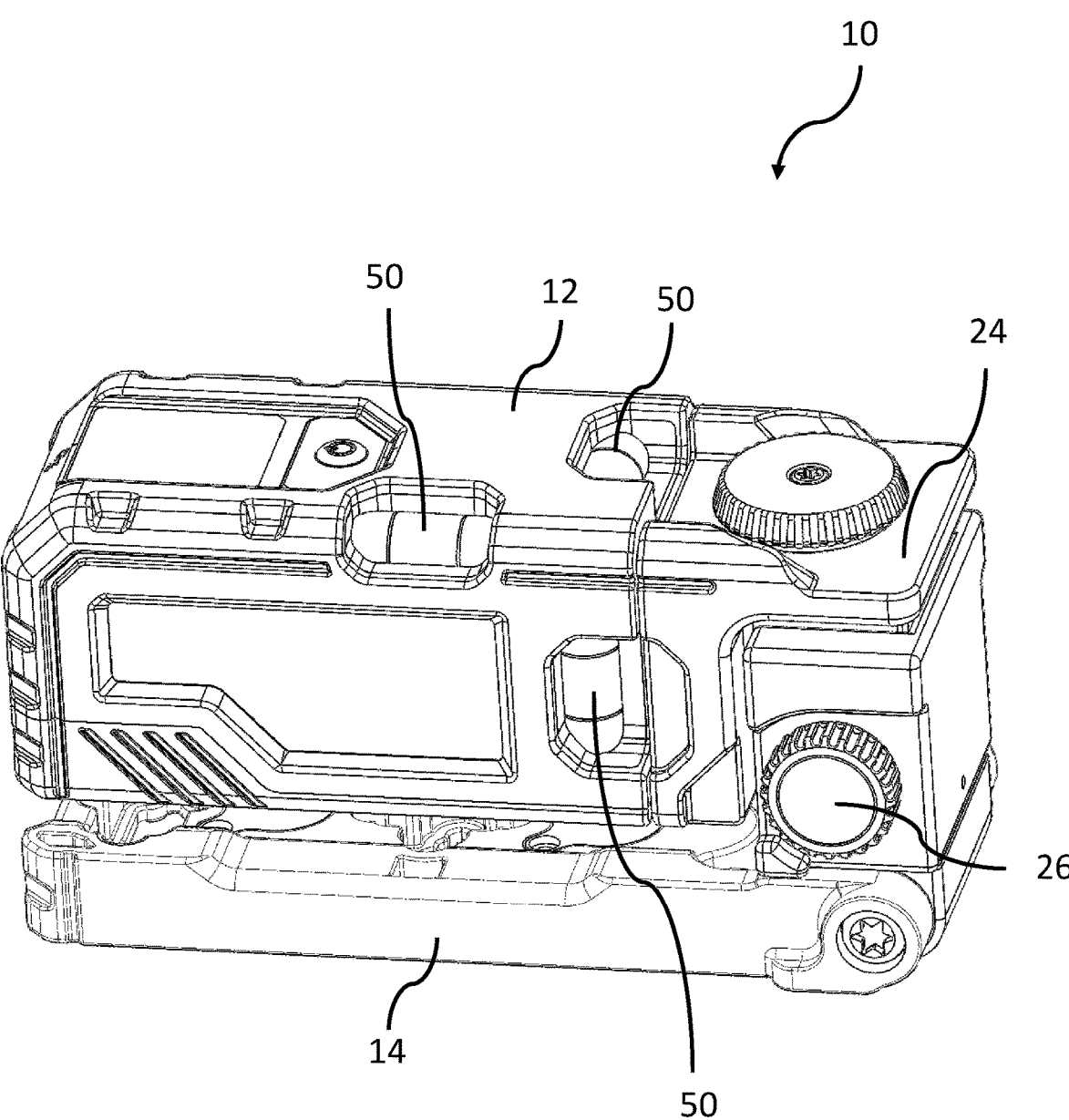
FIG. 1 is a perspective view of a laser level.
Figure 2:
FIG. 2 is a side view of the laser level of FIG. 1.
Figure 2:
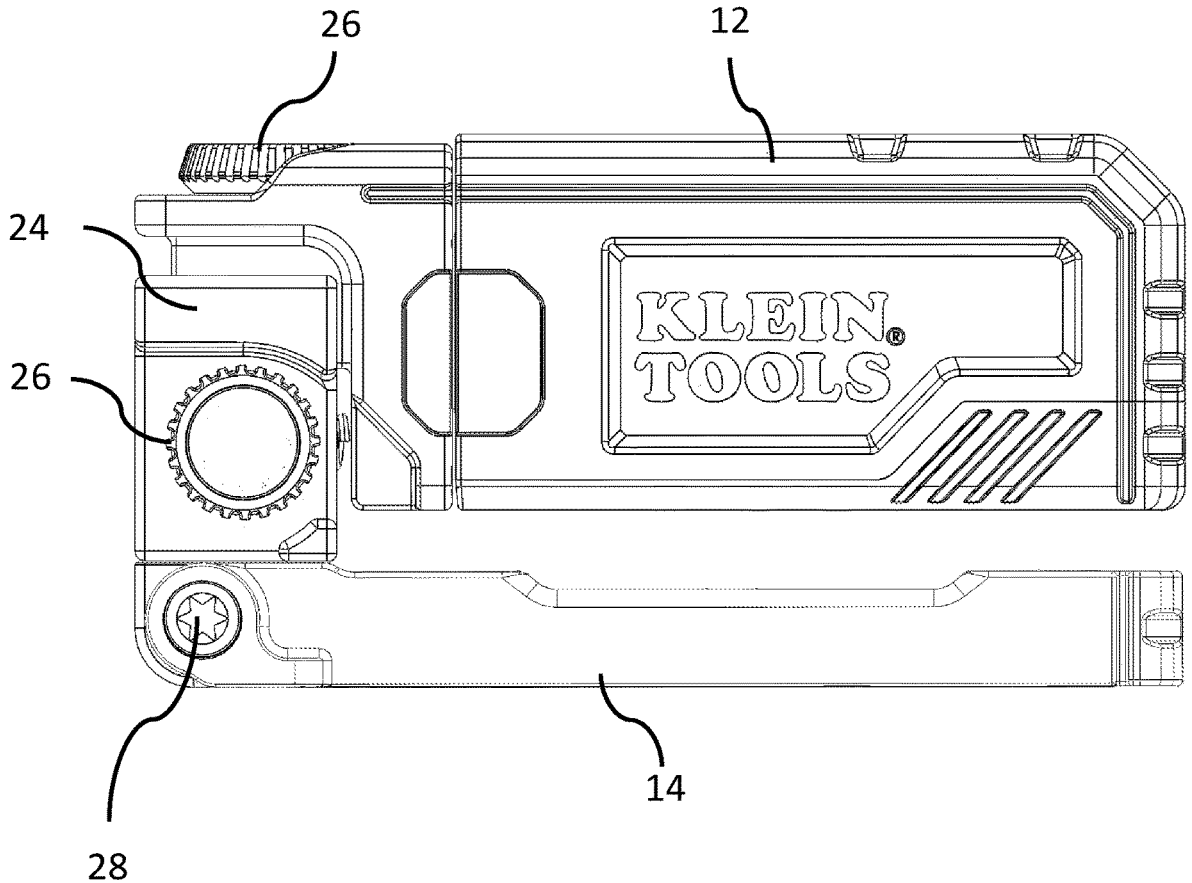
Figure 3:
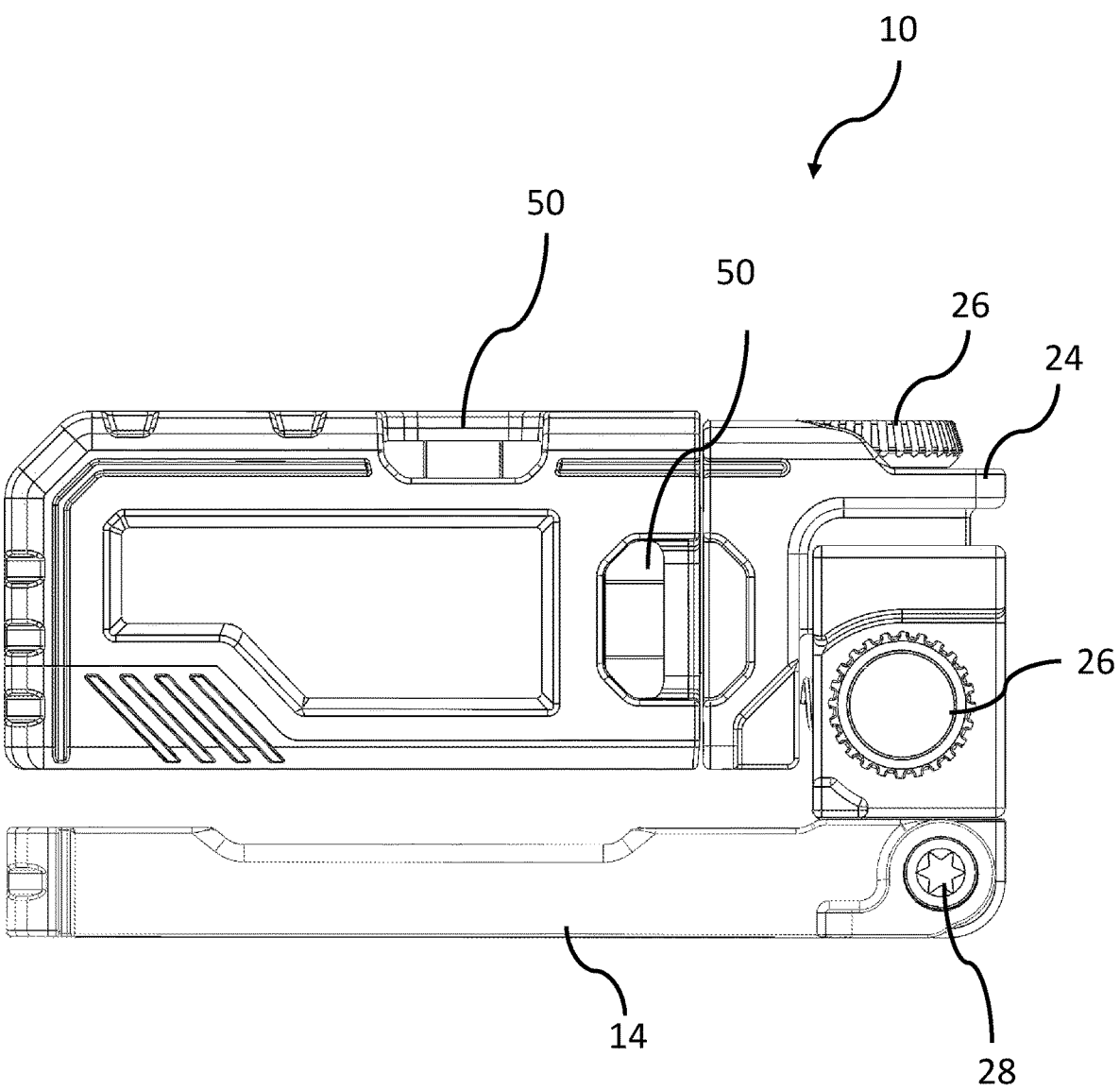
FIG. 3 is another side view of the laser level of FIG. 1.
Figure 4:
FIG. 4 is a top view of the laser level of FIG. 1.
Figure 4:
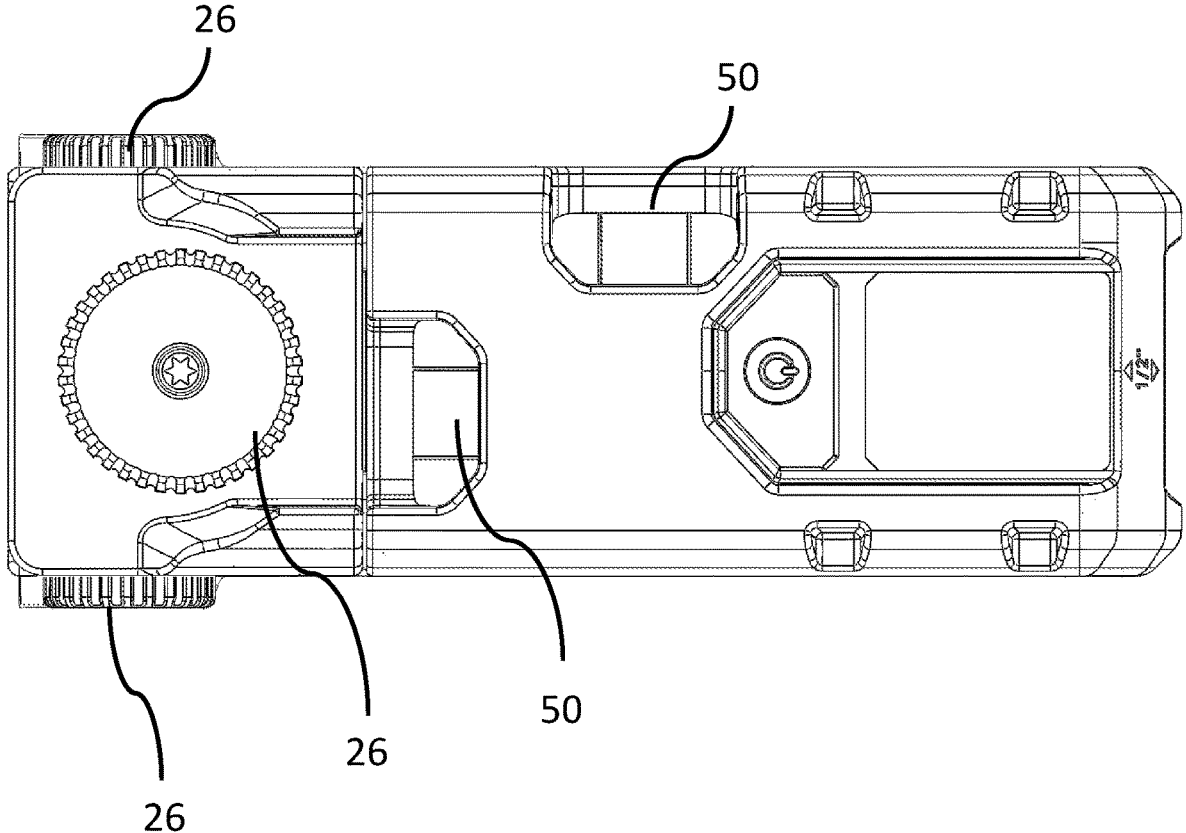
Figure 5:
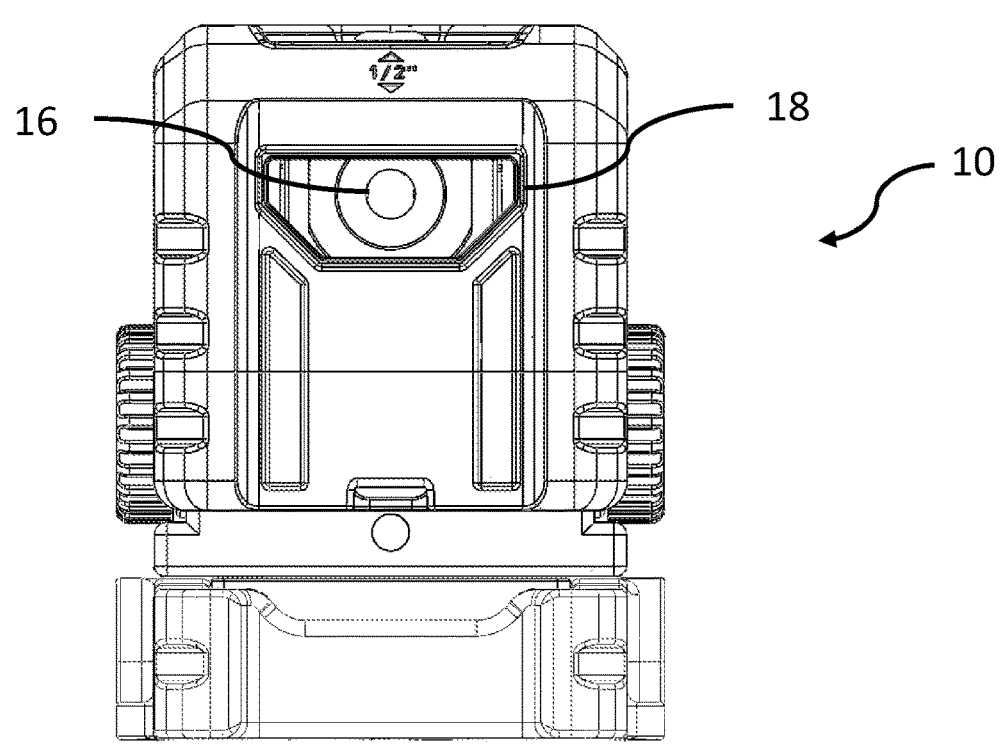
FIG. 5 is a front view of the laser level of FIG. 1.
Figure 6:
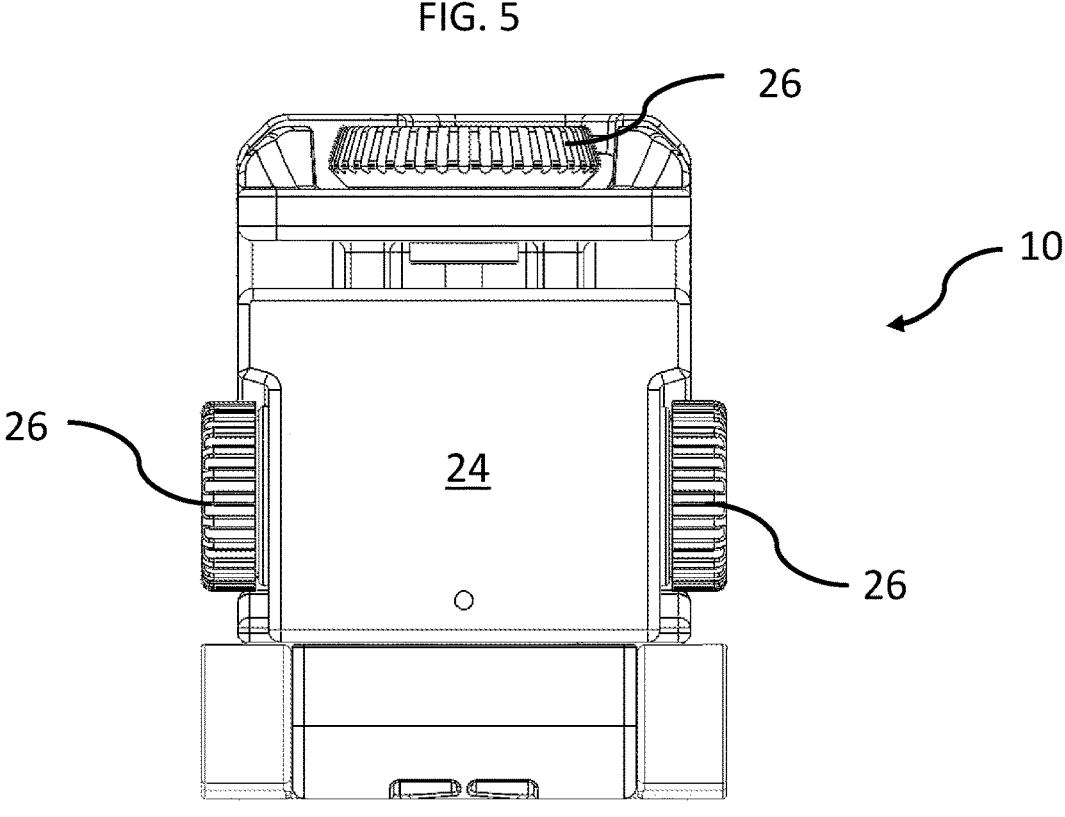
FIG. 6 is a rear view of the laser level of FIG. 1.

In the illustrated and preferred embodiment, the laser level 10 includes a housing 12 attached to a mounting base 14 (e.g., base, mount). As best shown in FIG. 5, the housing 12 includes a laser emitter 16 mounted (e.g., located) therein to emit a laser through a window 18 in the front of the housing 12. In the illustrated and preferred embodiment, laser is emitted by the laser emitter 16 in a horizontal plane from the front of the housing 12.

In the illustrated and preferred embodiment, the base 14 includes various mounting features for attaching (e.g., supporting, mounting) the laser level. The mounting features include a pair of magnets 19, a pair of hangers 20, and a threaded mount 22. The magnets 19, for example, allow the laser level 10 to be attached to magnetic surfaces (e.g., metal surfaces). The hangers 20 (e.g., through holes, holes, mounting holes), as another example, allow the laser level 10 to be attached to a surface by a screw, nail, or other objects protruding from a surface. The threated mount 22, as yet another example, allows the laser level 10 to be attached to a tripod or other threaded support.

In the illustrated and preferred embodiment, the adjustable laser level includes an adjustment portion 24 connecting the housing 12 to the base 14. In the illustrated and preferred embodiment, the adjustment portion 24 allows a user to make both bulk adjustments and micro-adjustments of the housing 12 relative to the base 14. The adjustment portion 24 rotates (e.g., pivots) to allow the housing 12 to be rotated about three axes (e.g., bulk adjustment, bulk rotation, manual adjustment, manual rotation) to adjust the direction of the laser. The adjustment portion 24 has a pair of micro-adjustment knobs 26 to allow finely change the orientation of the housing 12 about two axes.

Figure 7:
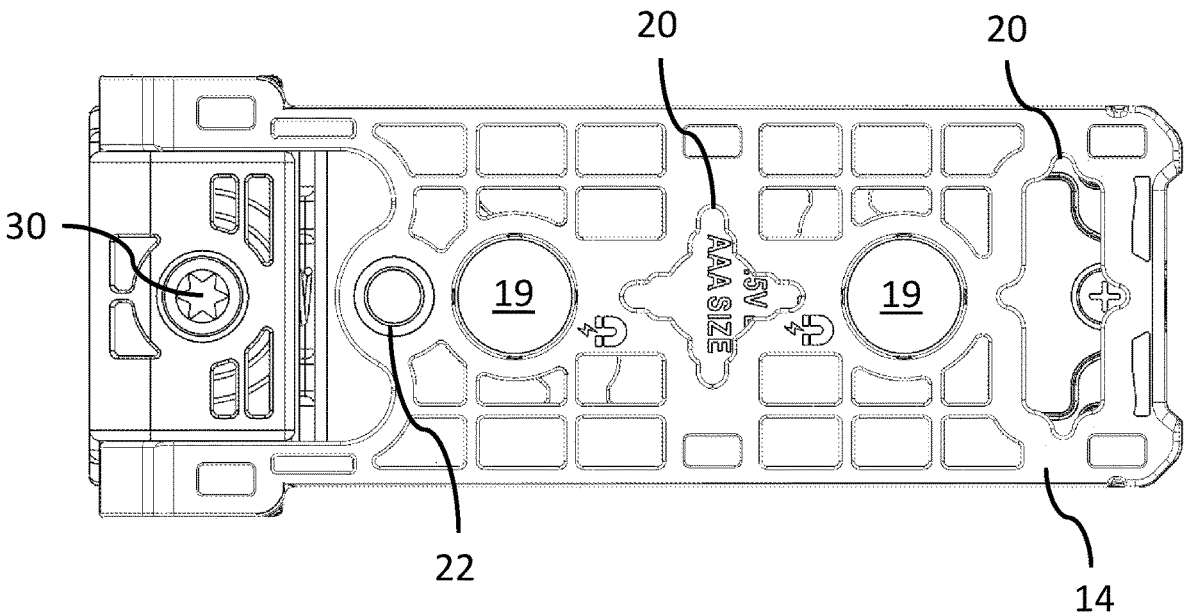
FIG. 7 is a bottom view of the laser level of FIG. 1.
Figure 8A:
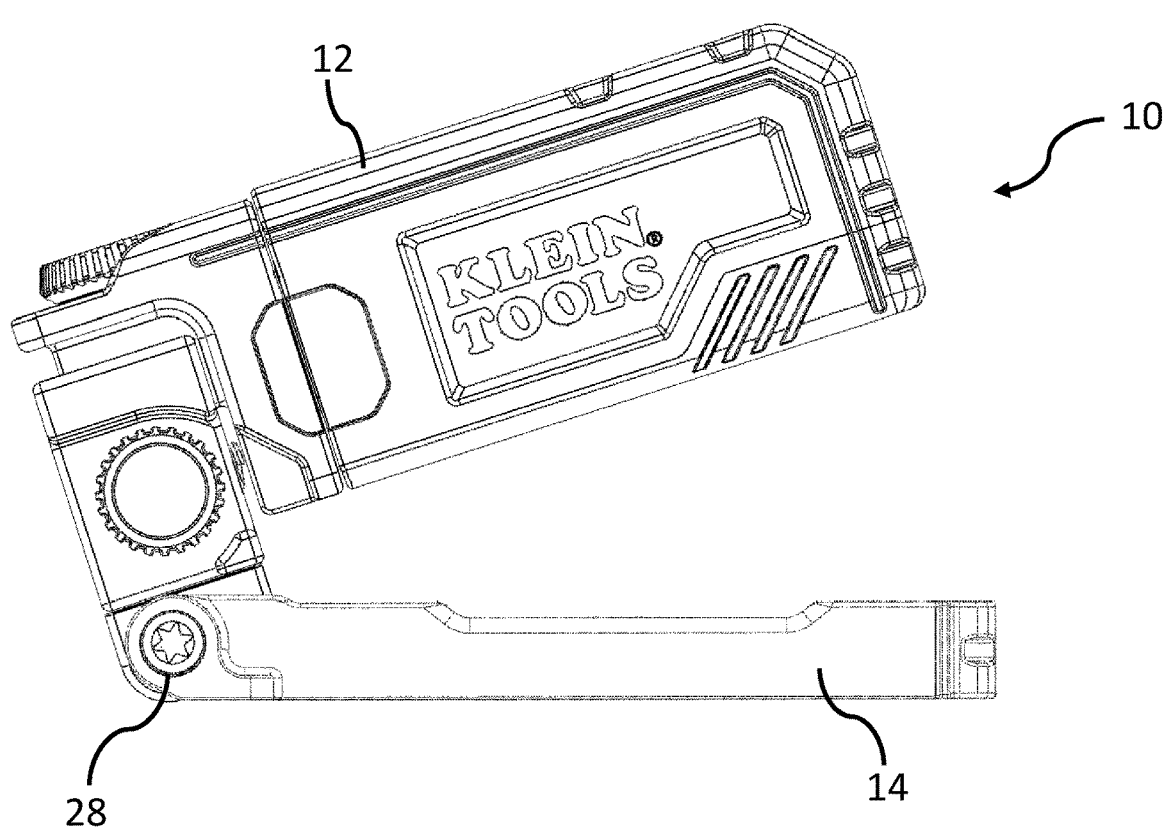
FIG. 8A is a side view of the laser level of FIG. 1 having a housing pivoted about a first axis relative to a base.
Figure 8B:
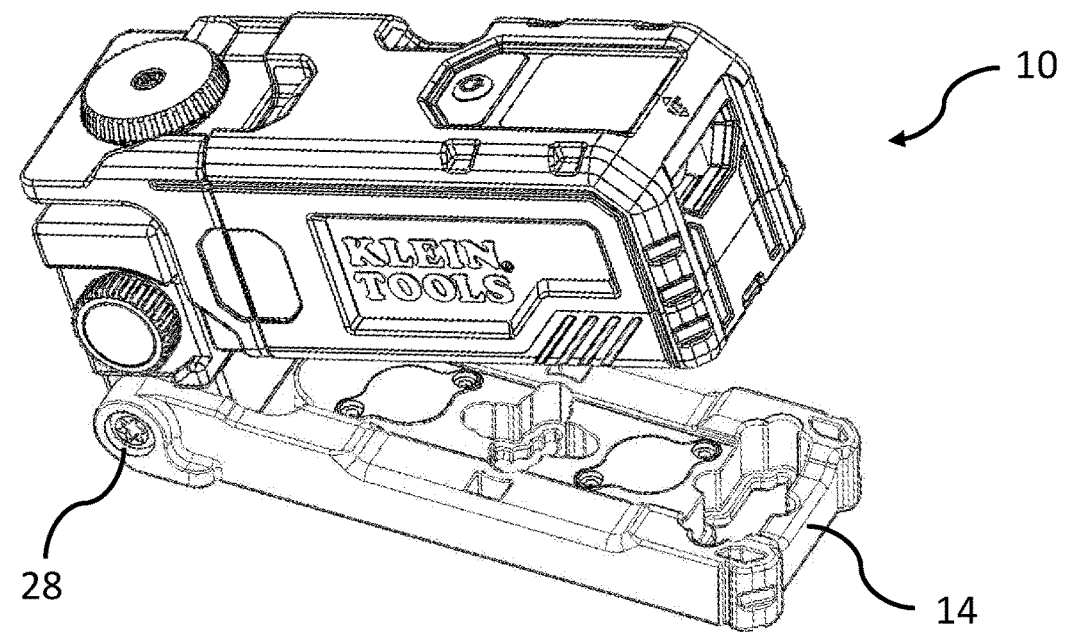
FIG. 8B is a perspective view of the laser level of FIG. 8A with the housing pivoted about the first axis relative to the base.

As best shown in FIGS. 8A-8B, the adjustment portion 24 is connected to the base via a first hinge 28. The first hinge 28 pivots (e.g., rotates) about a first axis to rotate the housing 12 in an upward direction (e.g., as shown in FIG. 8A) relative to the base 14. This rotation of the housing to an upward or raised position can be seen comparing FIG. 2 to FIG. 8A.

Figure 9A:
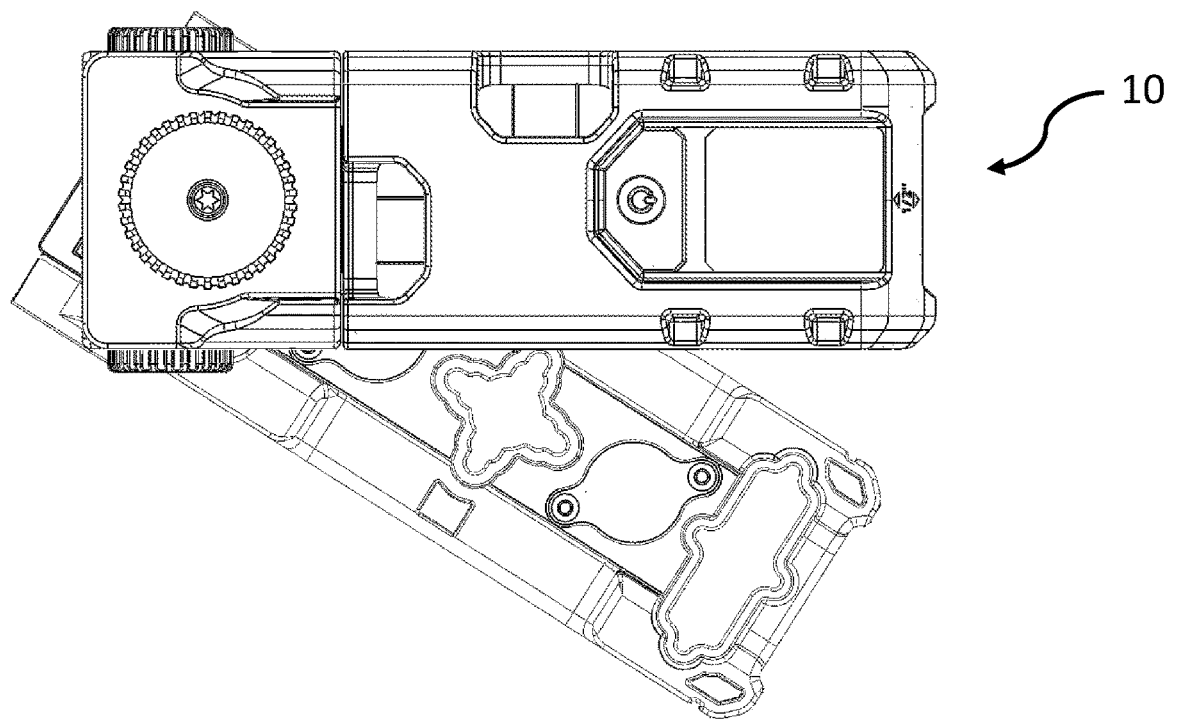
FIG. 9A is a top view of the laser level of FIG. 1 having the housing pivoted about a second axis relative to the base.
Figure 9B:
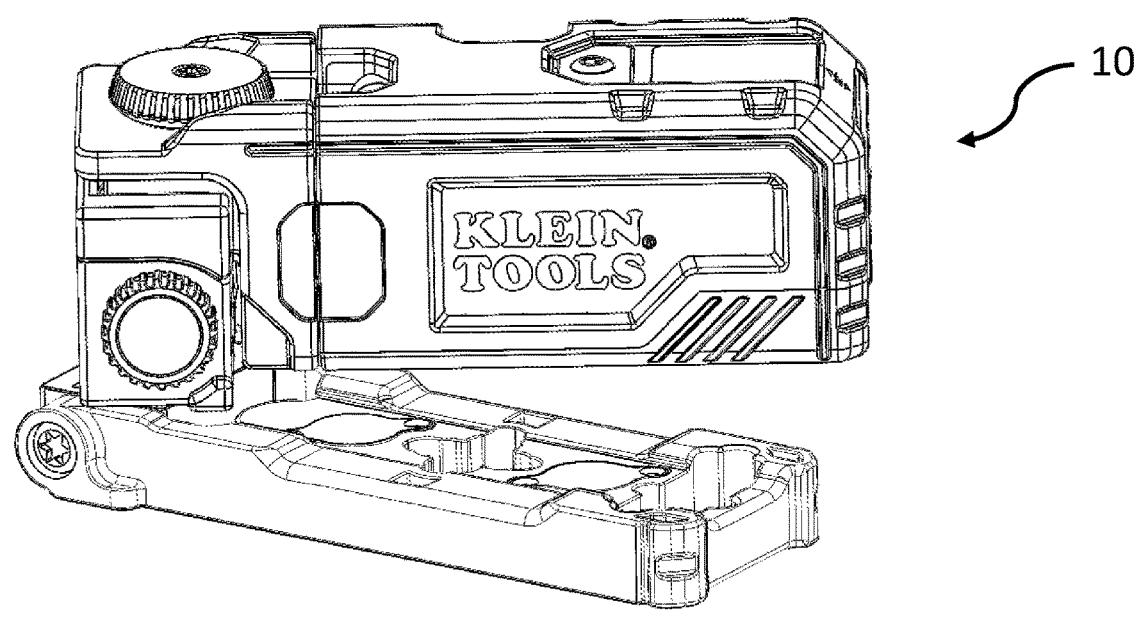
FIG. 9B is a perspective view of the laser level of FIG. 9A with the housing pivoted about the second axis relative to the base.

As best shown in FIGS. 9A-9B, the adjustment portion 24 can rotate about a second axis about pivot point 30 (e.g., rotates about a shaft) (best shown in FIG. 7). Rotation about the second axis allows a user to rotate the housing 12 relative to the base 14. This rotation of the housing 12 relative to the base can be seen comparing FIG. 4 to FIG. 9A. In the illustrated and preferred embodiment, the second axis is perpendicular to the first axis.

Figure 10A:
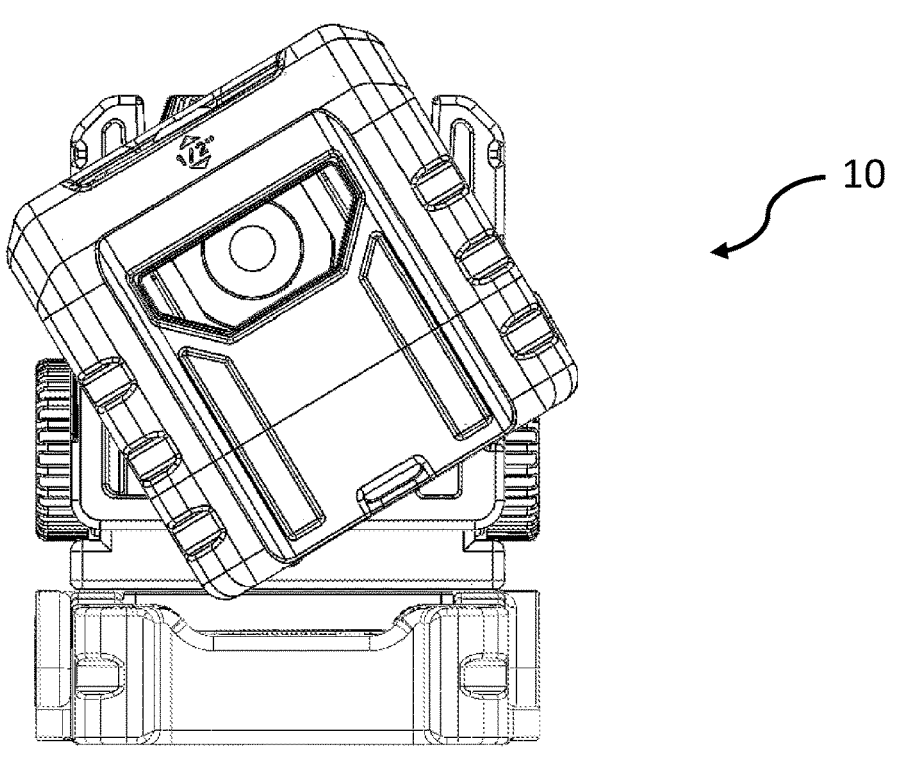
FIG. 10A is a front view of the laser level of FIG. 1 having the housing pivoted about a third axis relative to the base.
Figure 10B:
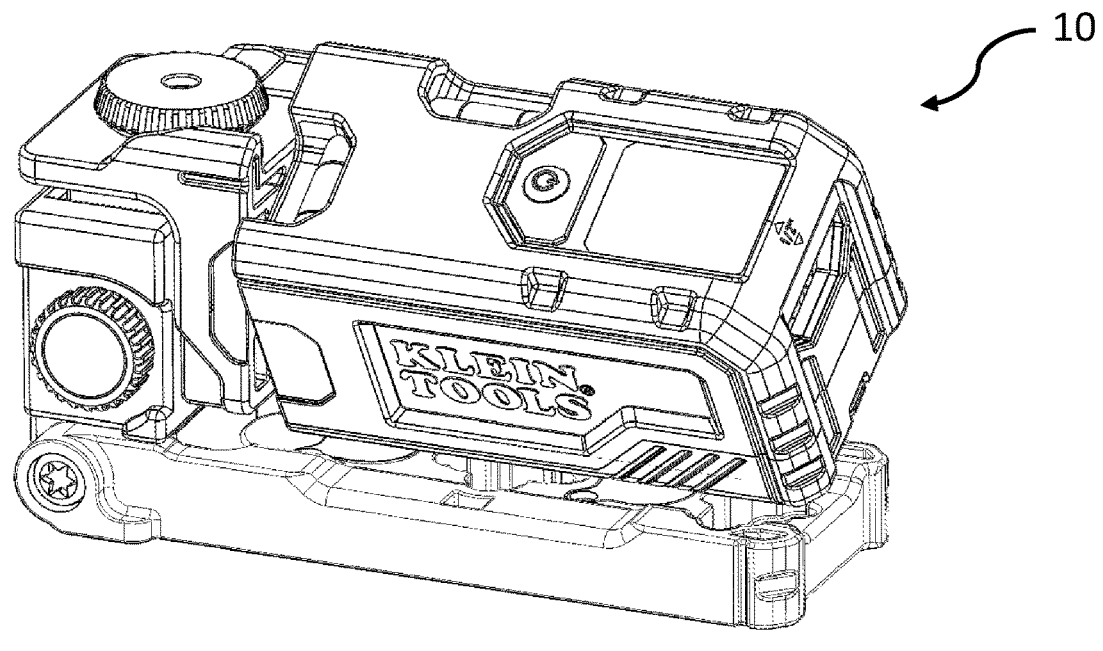
FIG. 10B is a perspective view of the laser level of FIG. 10A with the housing pivoted about the third axis relative to the base.

As best shown in FIGS. 10A-10B, the adjustment portion 24 includes a rotational point to allow the housing 12 to rotate about a third axis. Rotation about the third axis allows a user to rotate the housing 12 relative to the base 14. This rotation of the housing can be seen comparing FIG. 5 to FIG. 10A. In the illustrated and preferred embodiment, the third axis is perpendicular to the first axis and the second axis.

Figure 11:
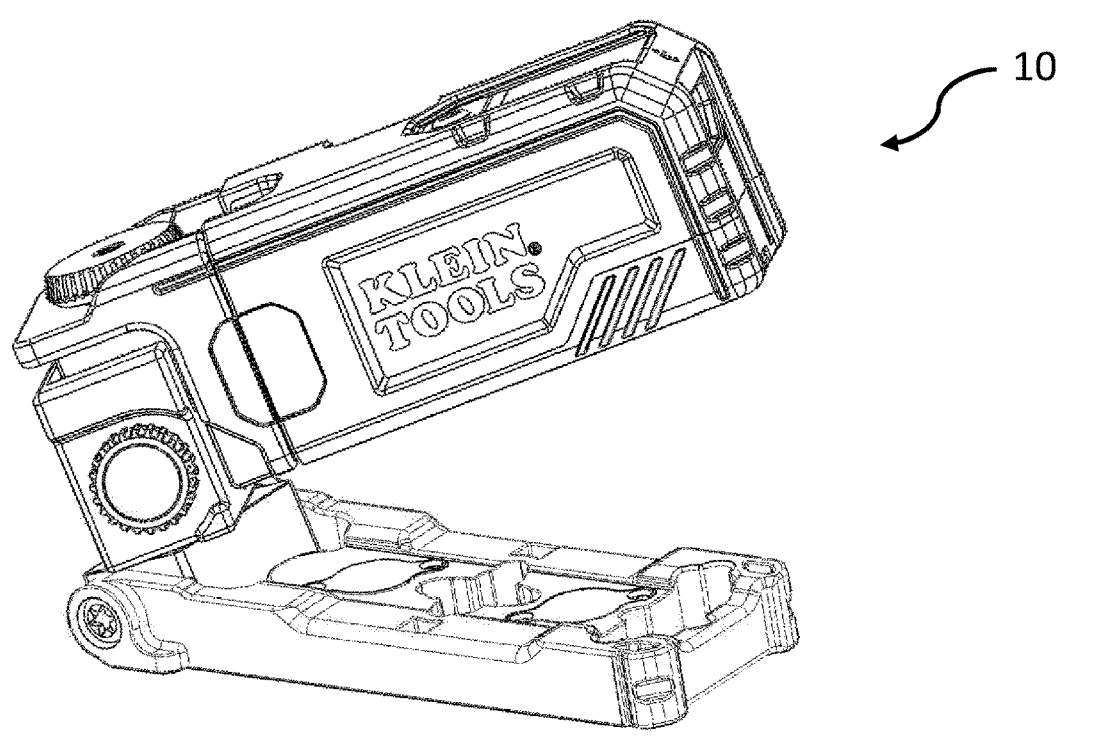
FIG. 11 is a perspective of the laser level of FIG. 1 having the housing pivoted about two axes relative to the base.
Figure 12:
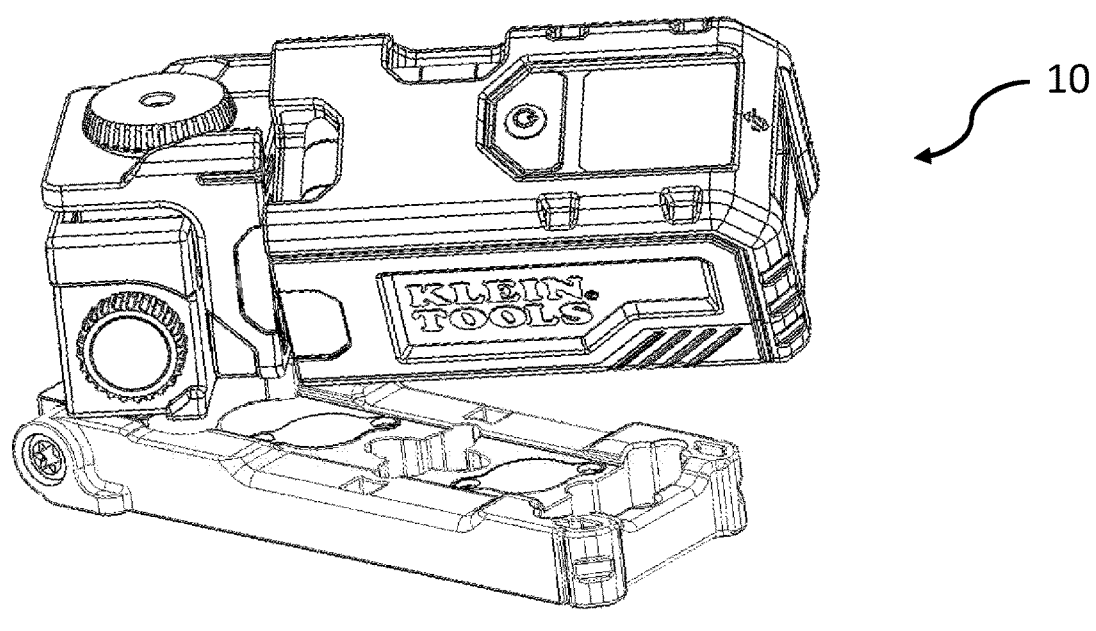
FIG. 12 is another perspective view of the laser level of FIG. 1 with the housing pivoted about two axes relative to the base.

In the illustrated and preferred embodiment, rotation about each of the three axes (e.g., bulk rotation) can be accomplished by manually rotating or pivoting the housing 12 relative to the base 14. In the illustrated and preferred embodiment, rotation about each of the three axes can be accomplished without movement micro-adjustment knobs 26. For example, a user may grasp the housing 12 and rotate or pivot the housing to reach the desired orientation. In some examples, the user may only rotate the housing 12 about one of the three adjustment axes, as shown in FIGS. 8A-10A. In other examples, the user may rotate the housing 12 about more than one axis, as is shown in FIGS. 11 and 12. FIG. 11 shows the housing 12 adjusted about two of the three axes (e.g., the first axis and the second axis). FIG. 12 also shows the housing 12 adjusted about two of the three axes (e.g., the second axis and the third axis). These adjustments allow a user to adjust the orientation of the laser emitted by the laser level 10 as necessary via bulk manual adjustments.

Figure 13:
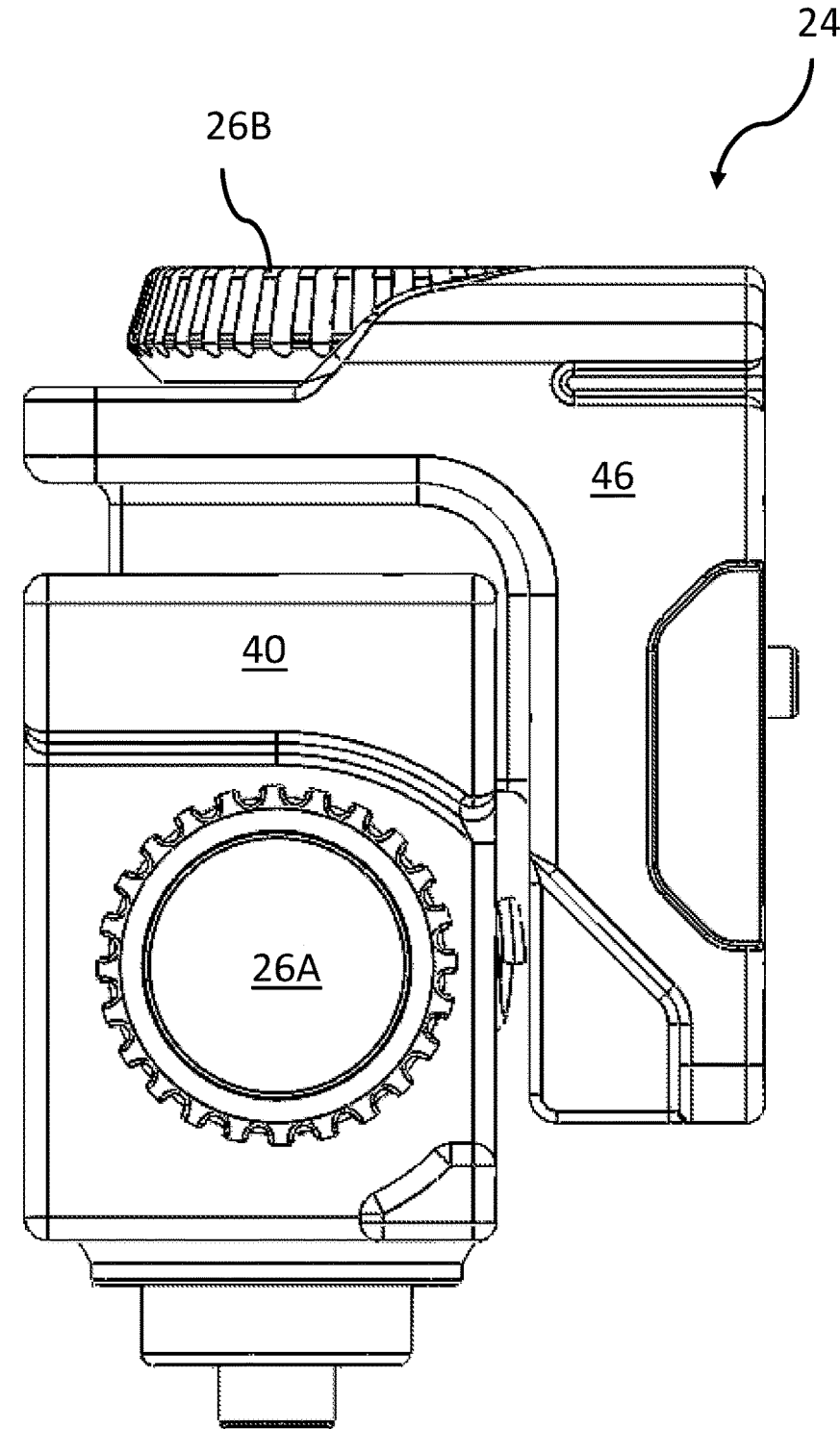
FIG. 13 is a side view of an adjustment portion of the laser level of FIG. 1.

The bulk adjustments discussed above allow a user to quickly adjust the housing 12 to a desired position. The friction provided by the hinges and pivot points associated therewith retain the housing 12 in the desired position. However, in some examples it may be difficult for a user to finely adjust the orientation of the housing 12. FIG. 13 shows a side view of the adjustment portion 24. The micro-adjustment knobs 26 allow a user to perform micro-adjustments to fine adjust (e.g., finetune) the orientation of the laser emitted by the housing 12.

Figure 14:
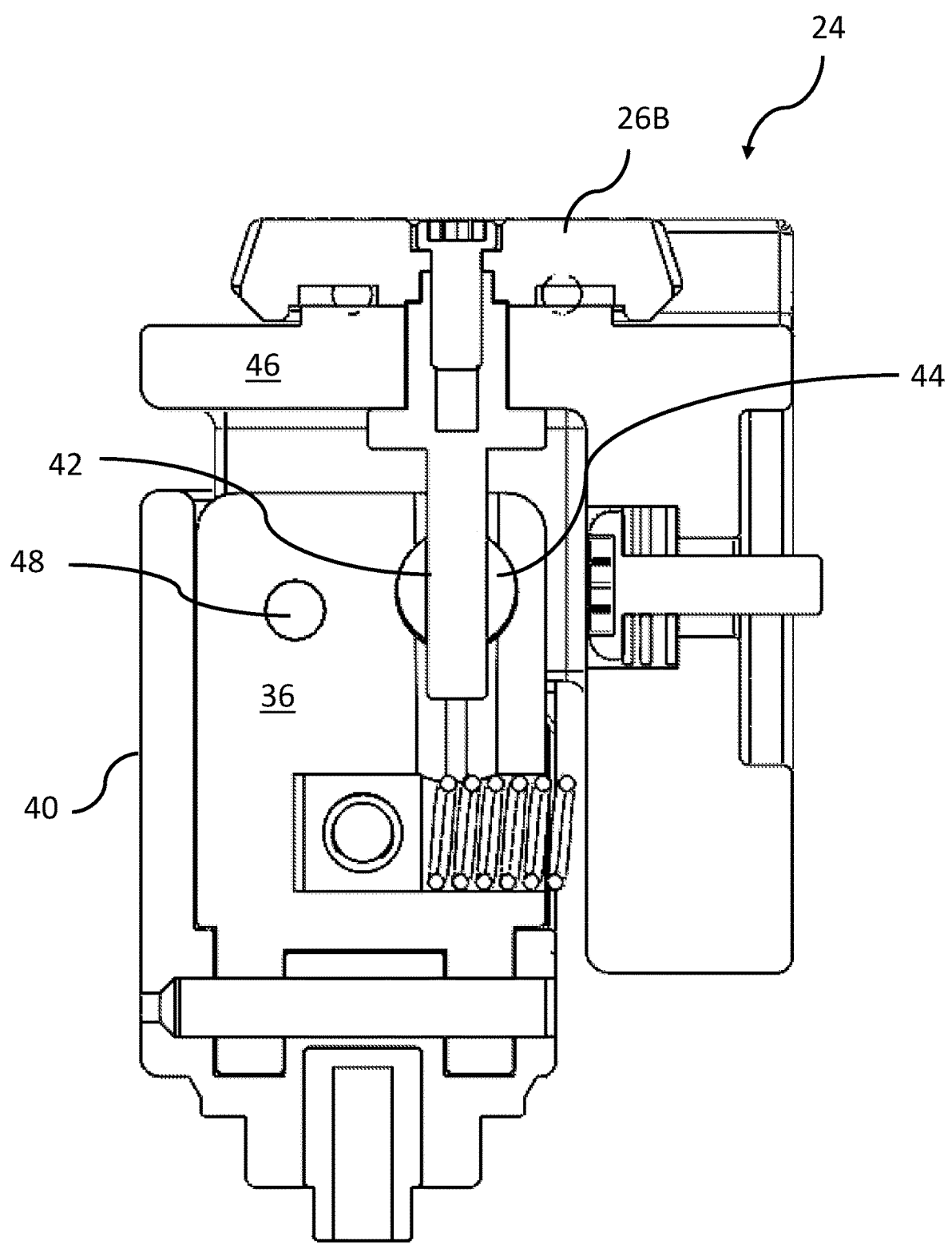
FIG. 14 is a cross-section view of the adjustment portion of FIG. 13
Figure 15:
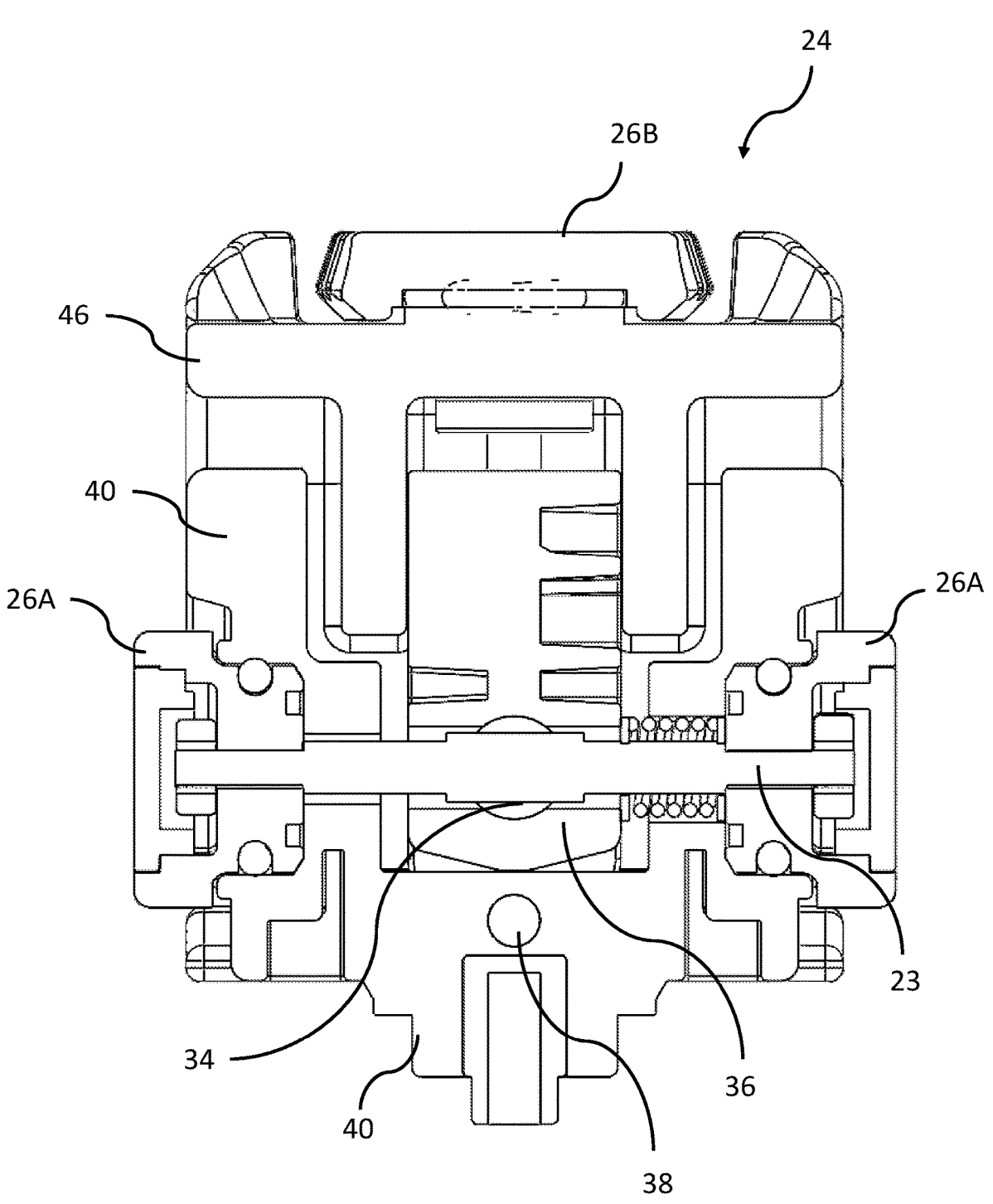
FIG. 15 is another cross-section view of the adjustment portion of FIG. 13.

FIG. 14 shows a cross-section side view of the adjustment portion 24 and FIG. 15 shows a cross-section side view of the adjustment portion taken perpendicular to FIG. 14. A first micro-adjustment knob 26A of the pair of micro-adjustment knobs 26 allows for micro-adjustment of the adjustment portion about a fourth axis. In one commercial embodiment, the micro-adjustment knob 26A is connected to a threaded pin 32. The threaded pin is connected to a nut 34. The nut 34 is retained within a pivoting middle adjustment piece 36. The middle adjustment piece 36 is connected by pin 38 to a bottom portion 40 of the adjustment portion 24. Rotation of the micro-adjustment knob 26A from either end rotates the threaded pin 32 through the nut 34 to pivot the middle adjustment piece 36 about the pin 38. The pin 38 defines a fourth axis where the middle adjustment piece 36 pivots about the fourth axis. A user can rotate the micro-adjustment knob 26A to pivot the middle adjustment piece 36 and the housing 12 about the fourth axis. The micro-adjustment knob 26A allows for fine adjustment of the housing 12 to align the laser as desired. In the illustrated and preferred embodiment, the fourth axis is parallel to the third axis. In the illustrated and preferred embodiment, the fourth axis is perpendicular to the first axis and the second axis.

As best shown in FIG. 14, a second micro knob 26B of the pair of micro-adjustment knobs 26 allows for micro-adjustment of the adjustment portion along a fifth axis. In one commercial embodiment, the micro-adjustment knob 26B is connected to a second threaded pin 42. The threaded pin 42 is connected to a second nut 44. The second nut 44 is retained within the middle adjustment piece 36. Rotation of the micro-adjustment knob 26B rotates the threaded pin 42 through the nut 44 to raise or lower top adjustment piece 46, with the second threaded pin 42, relative to the middle adjustment piece 36. The top adjustment piece 46 is attached to the middle adjustment piece 36 by pin 48. The pin 48 defines a fifth axis about which the user can adjust the top adjustment piece 46 of the adjustment portion 24. A user can rotate the micro-adjustment knob 26B to rotate the threaded pin 42 through the second nut 44 to rotate (e.g., pivot) the top adjustment piece 46 and the attached housing 12 about the fifth axis (e.g., as defined by the pin 48). The micro-adjustment knob 26B allows for fine adjustment of the housing 12 to align the laser as desired (e.g., about the fifth axis defined by the pin 48). In the illustrated and preferred embodiment, the fifth axis is parallel to the first axis. The fifth axis is perpendicular to the second axis, the third axis, and the fourth axis.

In the illustrated and preferred embodiment, the user may utilize both bulk adjustment of the housing 12 about to the first axis, the second axis, and the third axis, as well as micro-adjustment about the fourth axis and the fifth axis. Adjustment of the housing 12 relative to the base 14 allows a user to place or attach the base 14 to a surface and adjust the orientation (e.g., alignment) of the laser emitted from the housing. In the illustrated and preferred embodiment, the housing 12 three level indicators shown in the form of bubble levels 50 (e.g., bubble vial, spirit level), as are known in the art. The bubble levels 50 allow the user to measure (e.g., see) the levelness of the housing 12 relative to at least two axes. In the illustrated and preferred embodiment, at least one bubble level 50 indicates the levelness of the housing 12 relative to the second axis and at least one bubble level indicates the levelness of the housing 12 relative to the third axis. In the illustrated and preferred embodiment, at least one level indicates the levelness of the housing 12 relative to the fourth axis. In the illustrated and preferred embodiment, at least one level indicates the levelness of the housing 12 relative to the fifth axis. In the illustrated and preferred embodiment, each of the three bubble levels 50 are perpendicular to each other.

Preferred embodiments of the inventive concepts are described herein, including the best mode known to the inventor(s) for carrying out the inventive concepts. Variations of those preferred embodiments will become apparent to those of ordinary skill in the art upon reading the foregoing description. The inventor(s) expect skilled artisans to employ such variations as appropriate, and the inventor(s) intend that the inventive concepts can be practiced otherwise than as specifically described herein. Accordingly, the inventive concepts disclosed herein include all modifications and equivalents of the subject matter recited in the claims appended hereto as permitted by applicable law. Moreover, any combination of the above-described elements and features in all possible variations thereof is encompassed by the inventive concepts unless otherwise indicated herein or otherwise clearly contradicted by context. Further in this regard, while highly preferred forms of the laser level 10 are shown in the figures, it should be understood that this disclosure anticipates variations in the specific details of each of the disclosed components and features of the material dispenser and that no limitation to a specific form, configuration, or detail is intended unless expressly and specifically recited in an appended claim.

For example, while specific and preferred forms have been shown for the level indicators, other forms may be used. For example, while the housing 12 is shown including bubble levels 50, the housing 12 may include a multi-axis digital level and display.

As another example, while the micro-adjustment knob 26A is shown as adjusting the orientation of the housing about the fifth axis that is parallel to the third axis, in some examples the fifth axis may be the same axis as the third axis.

As a further example, while the micro-adjustment knob 26B is shown moving the housing 12 along the fifth axis, in some examples, the micro-adjustment knob 26B may pivot (e.g., rotate) the housing 12 relative to the base 14.

As another example, while the laser level 10 is shown having a bulk adjustment about three axes, in some examples the laser level 10 may have bulk adjustment about one or two axes.

In yet another example, while the laser level 10 is shown having two micro adjustments for rotation of the housing 12 about two axes, in some examples, the laser level 10 may only have micro-adjustment for rotation about one axis. In some examples, the laser level may have three micro-adjustments for rotation about three axes (e.g., three axes with each correlating to the first axis, the second axis, or the third axis).

As a further example, while the laser emitter is described as emitting a laser along a plane, in some examples the laser emitter may project a laser dot or two orthogonal laser planes. In some examples, other light emitters may be used in place of the laser emitter.

As another example, while the adjustment portion 24 has been shown including pivot points rotating about a shaft and hinges, in some examples the adjustment portion 24 may include a ball joint.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. The use of any and all examples, or exemplary language (e.g., "such as") provided herein, is intended merely to better illuminate the inventive concepts disclosed herein and does not pose a limitation on the scope of any invention unless expressly claimed. No language in the specification should be construed as indicating any non-claimed element as essential to the practice of the inventive concepts disclosed herein.

What is claimed is:

1. A laser level comprising:
   a housing including a laser emitter to emit a laser along a plane;
   a mounting base connected to the housing, wherein the housing is pivotable relative to the mounting base about a first axis, a second axis, and a third axis by a user grasping the housing and moving the housing; and
   wherein the housing includes:
      a first micro-adjustment knob to adjust the housing, relative to the mounting base, about a fourth axis; and
      a second micro-adjustment knob to adjust the housing, relative to the mounting base, about a fifth axis perpendicular to the fourth axis.

2. The laser level of claim 1, wherein the housing includes a bubble level to indicate the levelness of the housing relative to one of the three axes and the fourth axis.

3. The laser level of claim 1, wherein:
   the housing includes a first bubble level and a second bubble level;
   the first bubble level indicates the levelness of the housing relative to the first axis and the fourth axis;

7 the second bubble level indicates the levelness of the housing relative to the second axis and the fifth axis.

4. The laser level of claim 3, wherein:

the housing includes a third bubble level on a side of the housing different from the first bubble level; and the third bubble level indicates the levelness of the housing relative to the first axis and the fourth axis.

5. The laser level of claim 1, wherein the mounting base includes a magnet and at least one through hole for mounting the mounting base to a structure.

6. The laser level of claim 1, wherein the housing is pivotable relative to the mounting base about the three axes without movement of the first micro-adjustment knob and the second micro-adjustment knob.

7. A laser level comprising:

a housing including a laser emitter to emit a laser along a plane;

a mounting base connected to the housing, wherein the housing is manually pivotable relative to the mounting base about a first axis and a second axis; and wherein the housing includes a first micro-adjustment knob to adjust the housing, relative to the mounting base, about a third axis, and a second micro-adjustment knob to adjust the housing, relative to the mounting base, about a fourth axis.

8. The laser level of claim 7, wherein the housing includes a bubble level to indicate the levelness of the housing relative to the first axis and the third axis.

9. The laser level of claim 7, wherein the housing is manually pivotable relative to the mounting base by a user grasping the housing and moving the housing.

10. The laser level of claim 7, wherein:

the housing includes a first bubble level, a second bubble level, and a third bubble level;

8 the first bubble level indicates the levelness of the housing relative to the first axis and the fourth axis;

the second bubble level indicates the levelness of the housing relative to the second axis and a fifth axis; and the third bubble level indicates the levelness of the housing relative to the first axis or the second axis.

11. A laser level comprising:

a housing including a laser emitter to emit a laser along a plane and a level indicator;

a mounting base connected to the housing, wherein the housing is pivotable relative to the mounting base about a first axis, a second axis, and a third axis; and wherein the housing includes a first micro-adjustment knob to adjust the housing, relative to the mounting base, about a fourth axis, and a second micro-adjustment knob to adjust the housing, relative to the mounting base, about a fifth axis perpendicular to the fourth axis.

12. The laser level of claim 11, wherein the first axis is parallel to the fourth axis and the second axis is parallel to the fifth axis.

13. The laser level of claim 11, wherein the first axis, the second axis, and the third axis are perpendicular to each other.

14. The laser level of claim 11, wherein the level indicator is a bubble level.

15. The laser level of claim 11, wherein the housing is pivotable relative to the mounting base by a user rotating the first micro-adjustment knob or the second micro-adjustment knob.

16. The laser level of claim 11, wherein the housing is pivotable relative to the mounting base by a user grasping the housing and moving the housing.

* * * * *